United States Patent
Kothe et al.

(10) Patent No.: US 7,422,268 B2
(45) Date of Patent: Sep. 9, 2008

(54) SLIDING DOOR ARRANGEMENT FOR A MOTOR VEHICLE

(75) Inventors: Markus Kothe, Velbert (DE); Frank Hoerschgen, Solingen (DE)

(73) Assignee: Brose Schliesssyteme GmbH & Co., KG, Wuppertal (DE)

( * ) Notice: Subject to any disclaimer, the term of this patent is extended or adjusted under 35 U.S.C. 154(b) by 48 days.

(21) Appl. No.: 11/553,638

(22) Filed: Oct. 27, 2006

(65) Prior Publication Data
US 2007/0096504 A1   May 3, 2007

(30) Foreign Application Priority Data
Oct. 28, 2005   (DE)  .................. 20 2005 017 077 U

(51) Int. Cl.
 *B60J 5/06* (2006.01)
(52) U.S. Cl. ............................ 296/155; 49/279; 49/280; 49/360; 292/DIG. 23
(58) Field of Classification Search ................... 49/279, 49/280, 360; 292/102, 103, 106, 108, 123, 292/127, DIG. 23, DIG. 43; 296/155, 190.11
See application file for complete search history.

(56) References Cited

U.S. PATENT DOCUMENTS

| | | | |
|---|---|---|---|
| 960,381 A * | 6/1910 | Neuenschwander | ......... 292/136 |
| 3,198,564 A | 8/1965 | Welsh | |
| 3,851,905 A | 12/1974 | Klebba | |
| 4,502,246 A | 3/1985 | Minami | |
| 4,662,109 A | 5/1987 | Yui et al. | |
| 5,520,423 A | 5/1996 | Finkelstein et al. | |
| 6,036,257 A * | 3/2000 | Manuel | ...................... 296/155 |
| 6,279,267 B1 * | 8/2001 | Barrett et al. | .................. 49/224 |
| 6,328,374 B1 * | 12/2001 | Patel | .......................... 296/155 |
| 6,477,806 B1 * | 11/2002 | Asada et al. | ................... 49/169 |
| 7,137,662 B2 * | 11/2006 | Nakayama et al. | ...... 296/190.11 |
| 2004/0256883 A1 * | 12/2004 | Ichinose et al. | ............. 296/155 |
| 2006/0059783 A1 * | 3/2006 | Braun et al. | ................... 49/360 |

FOREIGN PATENT DOCUMENTS

| | | |
|---|---|---|
| DE | 102004022826 A1 | 12/2005 |
| EP | 309239 A * | 3/1989 ................. 296/155 |
| GB | 2135724 A | 9/1984 |

* cited by examiner

*Primary Examiner*—D. Glenn Dayoan
*Assistant Examiner*—Paul A Chenevert
(74) *Attorney, Agent, or Firm*—David S. Safran

(57) ABSTRACT

Sliding door arrangement for a motor vehicle having a lock arrangement, for fixing a sliding door in opened and closed positions, with a catch lever arrangement with a pivoting catch lever that is movable into engaged and raised states and is pretensioned toward the engaged state. The catch lever arrangement has first and second engagement elements with which the catch lever engageable, the catch lever, when the sliding door is in the opened position, engaging the first engagement element and the catch lever fixing the sliding door in the opened position. The catch lever is engageable with the second engagement element when the sliding door is in the closed position and the catch lever fixes the sliding door in the closed position. The arrangement is such that the pretensioning of the catch lever toward the engaged state rises by the movement of the sliding door into the closed position.

16 Claims, 6 Drawing Sheets

SLIDING DOOR ARRANGEMENT FOR A MOTOR VEHICLE

BACKGROUND OF THE INVENTION

1. Field of the Invention

This invention relates to a sliding door arrangement for a motor vehicle in which the sliding door is slidable into opened and closed positions, and in which a lock arrangement is provided for fixing the sliding door in the opened and in the closed position, the lock arrangement having a catch lever arrangement, the catch lever arrangement having a pivoting catch lever, the catch lever being movable into an engaged state and into a raised state and being pretensioned into the engaged state, the catch lever arrangement having a first engagement element and a second engagement element which the catch lever engages in an engaged state, the catch lever, when the sliding door is in the opened position being able to engage the first engagement element and the catch lever which is then in the engaged state fixing the sliding door in the opened position.

The invention is also directed to a sliding door arrangement for a motor vehicle in which the lock arrangement has a latch arrangement a pivoting latch and a ratchet, the latch being movable between an open position and a catch position and being held in the catch position by the ratchet, the latch arrangement having a first engagement element and a second engagement element and the latch engaging the second engagement element when the sliding door is moved into the closed position thereby being transferred into the catch position and fixing the sliding door in the closed position.

Furthermore, the invention also relates to a sliding door arrangement for a motor vehicle in which the lock arrangement has a latch arrangement, the latch arrangement having a pivoting latch and a ratchet, the latch being movable between an open position and a catch position and being held in the catch position by the ratchet, the latch arrangement having a first engagement element and a second engagement element and the latch engaging the second engagement element when the sliding door is moved into the closed position, thereby being transferred into the catch position and fixing the sliding door in the closed position The invention also relates to the lock arrangements of aforementioned sliding door arrangements.

2. Description of Related Art

Here, the expression "sliding door arrangement" combines all components which are necessary for the functionality of a sliding door. They include, in addition to the sliding door itself, also the corresponding frame which is provided in the motor vehicle body, guide rails, etc.

Sliding doors have been used for a long time for delivery trucks and vans, more recently also increasingly for passenger vehicles. It is common to all sliding doors that they can be moved by a sliding motion into an opened position and into a closed position. This sliding motion takes place essentially parallel to the side wall of the motor vehicle. The fact that it is possible to load and unload and to get in and out without difficulty is especially advantageous. Against this background, operating safety, especially secure fixing of the sliding door in the closed position, is becoming more and more important, the increase in operating safety to be associated as little as possible with an increase in costs. At the same time, the requirements for ease of use increase.

The known sliding door arrangement (German Patent Application DE 33 10 961 A1; U.S. Pat. No. 4,502,246) underlying this invention shows comparatively great ease of use. Here, there is a conventional lock arrangement for fixing the door in the closed position. To fix the sliding door in the opened position, the lock arrangement is equipped with a catch lever arrangement which has a pivoting catch lever with a hook-shaped portion. When the sliding door is in the opened position, the catch lever, especially the hook-shaped portion of the catch lever, can be caused to engage an engagement element which is located on the body of the vehicle, the sliding door being fixed in the open position by the catch lever which is in the locked state. By manual actuation by the user the catch lever can be moved into the raised state so that the sliding door can be moved again in the direction of its closed position. This fixing of the sliding door in the opened position is especially advantageous when the motor vehicle is on a slope and the sliding door would automatically move into the closed position by the force of gravity without additional fixing. The disadvantage in the known sliding door arrangement is the fact that fixing of the sliding door in the closed state is not adequate in certain cases. One example of this is a side impact in case of a crash in which the sliding door is guided simply on guide rails or the like and can easily pull out where the lock arrangement does not act.

A different known sliding door (U.S. Pat. No. 4,662,109) shows high operating reliability even in the case of a crash, since viewed in the lengthwise direction of the motor vehicle there is the lock of the lock arrangement both in the forward area and also in the rear area of the sliding door. In this way, the above described pulling out of the sliding door in case of a crash is effectively prevented. However, fixing of the sliding door in the opened position is not implemented. Moreover, overall, this sliding door arrangement has a very complex construction.

Simplification of the construction of a sliding door arrangement which also has the function of fixing the sliding door in the opened position is shown by British Patent Application GB 2 210 339 A. There, it is provided that the function of fixing the sliding door in the closed position is combined with the function of fixing the sliding door in the opened position; therefore, the lock intended for this purpose is used twice. A construction for implementation of this concept is, in any case, not suggested.

One possible manner of implementing the aforementioned double use of a lock is given in U.S. Pat. No. 3,198,564 in which a latch made as a rotary latch is proposed that interacts with a ratchet arrangement. The latch has a first inlet mouth for engaging a first engagement element and a second inlet mouth for engaging a second engagement element. The two engagement elements are located on opposite sides of the opening of the vehicle body which is to be closed, so that fixing of the sliding door both in the opened position and also in the closed position is possible. This approach is, in turn, structurally complex due to the necessity of the existence of a ratchet arrangement.

SUMMARY OF THE INVENTION

A primary object of the present invention is to embody and develop the known sliding door arrangement such that a high level of crash safety is obtained, on the one hand, and great ease of use is achieved, on the other hand, with a compact, and at the same time, economical structure.

The aforementioned object is achieved in a sliding door arrangement of the initially mentioned types in which the catch lever engages the second engagement element when the sliding door is in the closed position and wherein the catch lever, which is then in the engaged state, fixes the sliding door in the closed position and pretensioning of the catch lever in the direction of the engaged state rises by the movement of the sliding door into the closed position.

A fundamental consideration is that a simple catch lever can be used both for fixing the sliding door in the opened position and also for fixing the sliding door in the closed position. Here, it is provided that the same catch lever assumes both functions.

It has been further recognized here that the two aforementioned functions are not equivalent. The fixing of the sliding door in the opened position is a pure comfort function which hardly influences the operating safety. Furthermore, the holding forces necessary for this purpose are small.

It is different in the function of fixing the sliding door in the closed position. Here, the seal counterpressures are considerable, to say nothing of the forces which may occur in a crash. Furthermore, this function is of especially great importance with respect to the operating safety of the sliding door arrangement so that maximum reliability is necessary here.

With respect to the different "quality" of the two aforementioned functions, in accordance with the invention, it is provided that the pretensioning of the catch lever in the direction of the engaged state rises by the movement of the sliding door into the closed position. This means, first of all, that the pretensioning of the catch lever is minimal when the sliding door is in the opened position. This leads to the fact that the catch lever can be raised with minimum force. In the case of manual actuation, in turn, this means great ease of use.

When the sliding door is in the closed position, the pretensioning of the catch lever is conversely maximum. This means that the catch lever is pressed with high pretensioning into the engaged state. In the case of a crash, this means that the unwanted raising of the catch lever which is caused by the acceleration forces there is avoided. Crash safety is increased by the increased pretensioning of the catch lever.

Therefore, the positioning motion of the sliding door into the closed position is the cause of the rise of the pretensioning. However, this also means that the movement of the sliding door into the closed position is associated with increased expenditure of force. This, in turn, means that, when the sliding door is opened, a corresponding force acting in the opening direction is available. This can be used fundamentally for support of the opening process.

The increase of the pretensioning of the catch lever by the movement of the sliding door into the closed position can take place in numerous ways. For example, a linear increase is possible. However, a configuration is especially advantageous in which the pivoting of the carriage relative to the sliding door or its carrier component is used to tension the spring element. Here, it is such that the increase of the pretensioning of the catch lever takes place primarily in the last segment of the closing motion.

According to another teaching which acquires independent importance, there is a catch lever which is used both for fixing the sliding door in the opened position and also for fixing the sliding door in the closed position. In this connection, it has been recognized that the construction configuration of the catch lever is especially simple when the catch lever for fixing the sliding door in one position of the sliding door works as a hooked catch lever, and as a support catch lever in the other position of the sliding door. This means that the catch lever is, on the one hand, loaded by tension, and on the other hand, by pressure. As in a preferred embodiment, it can be easily provided that a hook-shaped portion for operation as a hooked catch lever and a support section for operation as a support catch lever are located on an arm of the catch lever. This leads to an especially compact, and at the same time, durable configuration of the catch lever.

According to another teaching which likewise acquires independent importance, the lock arrangement is equipped with the conventional latching elements, i.e., a latch and ratchet, which provide for fixing of the sliding door in the closed position. This further independent teaching is based on the consideration that the ratchet can be used for two purposes here. The ratchet can be used specifically in addition to fix the sliding door in the opened position. In doing so, the ratchet fundamentally assumes the function of the hooked and support catch lever explained above. This double use of the ratchet allows a further increase of compactness.

In all the above described sliding door arrangements, it is preferably provided that the lock arrangement has a main lock arrangement by which the sliding door can be fixed in the closed position, and an auxiliary lock arrangement to support the main lock arrangement. In this connection, the above described catch lever arrangements and the above described latch arrangement with the latch and ratchet are preferably assigned to the auxiliary lock arrangement. Especially high crash safety can be achieved by the main lock arrangement, on the one hand, and the auxiliary lock arrangement, on the other hand, being located on opposite regions of the sliding door viewed in the lengthwise direction of the motor vehicle. The main lock arrangement, in turn, preferably, has the latch elements latch and ratchet.

Other details, features and advantages of this invention are explained in detail below with reference to the accompanying drawings.

DETAILED DESCRIPTION OF THE INVENTION

Figure 1:
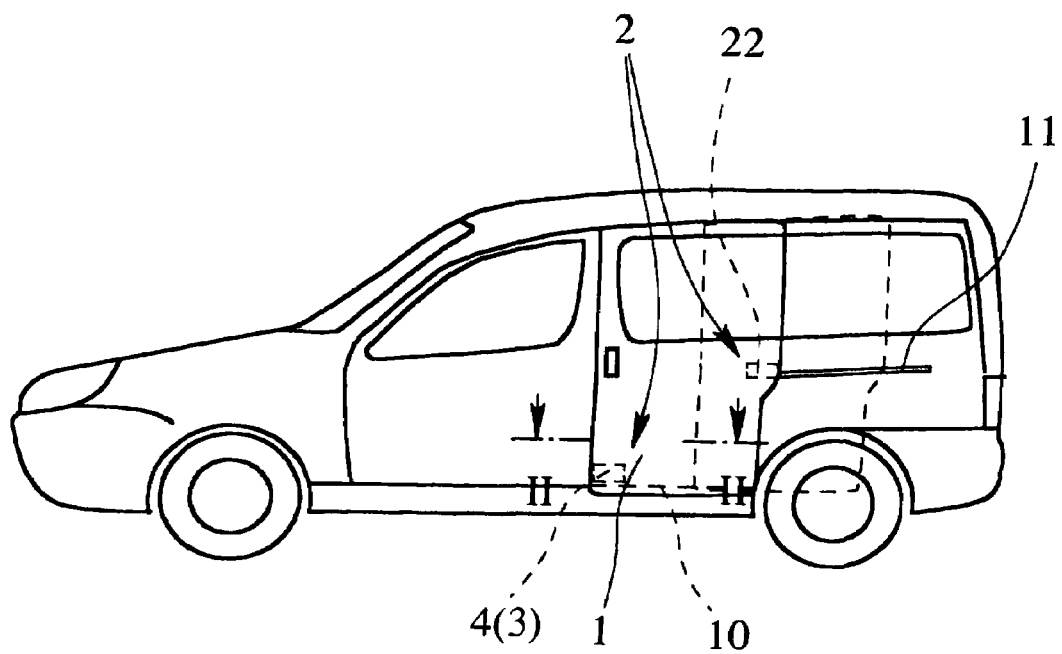
FIG. 1 schematically shows a motor vehicle with the sliding door arrangement in accordance with the invention.

In the drawings, FIG. 1 shows a motor vehicle with a sliding door arrangement which is located laterally on the vehicle. It is also equally possible for the sliding door arrangement to be located on the back of the motor vehicle. The sliding door arrangement has a sliding door 1 which can be moved by a sliding motion into an opened position (shown in FIG. 1 in broken lines) and into a closed position (shown in FIG. 1 in solid lines). The configuration of the guide of the sliding door 1 is detailed below.

To fix the sliding door 1 in the opened position, on the one hand, and in the closed position, on the other hand, there is a lock arrangement 2. Basically, the lock arrangement 2 can also be used to fix the sliding door 1 in the intermediate position.

Figure 2:
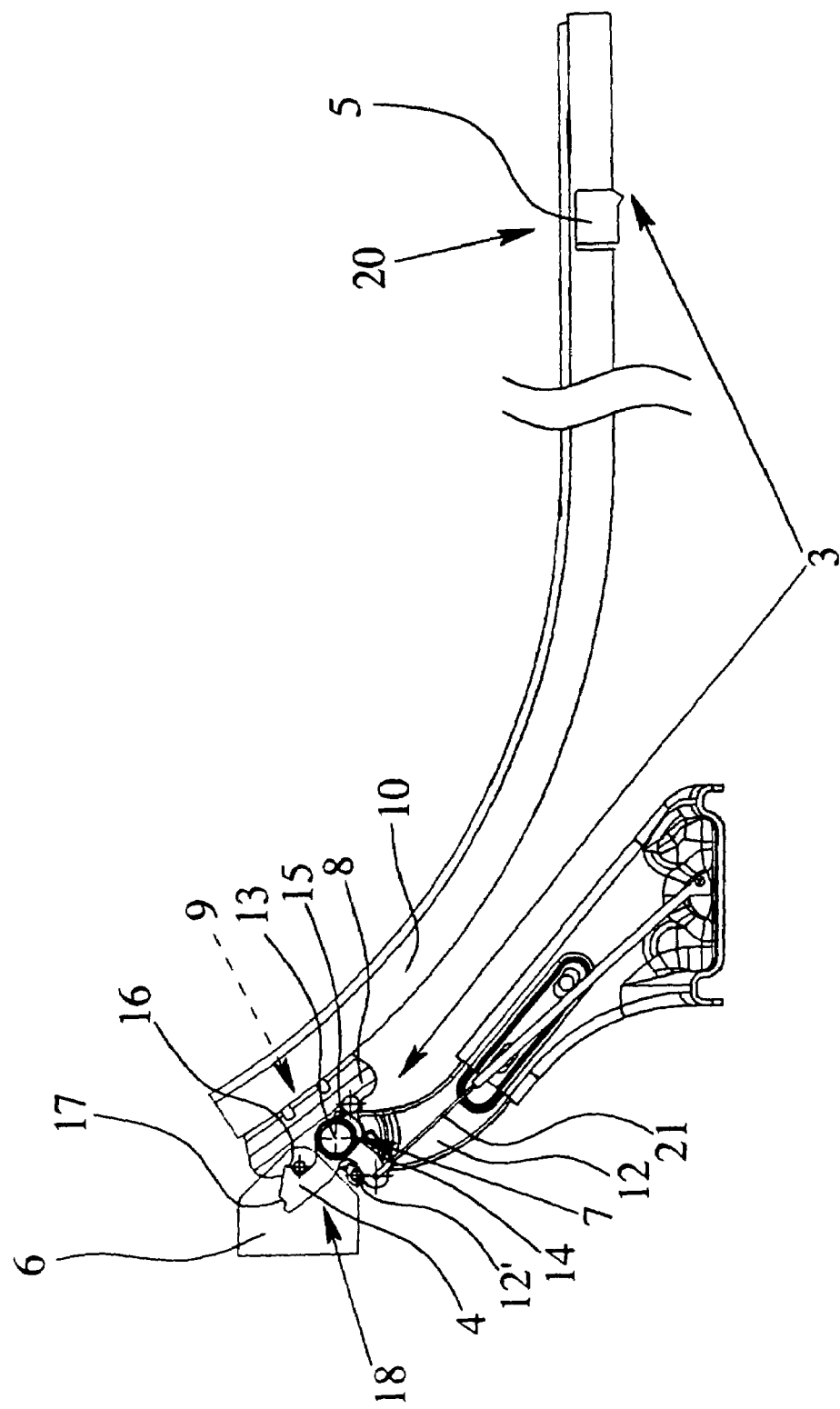
FIG. 2 shows important components of the sliding door arrangement of FIG. 1 in a sectional view taken along line II-II in FIG. 1 when the sliding door is in the closed position.
Figure 3:
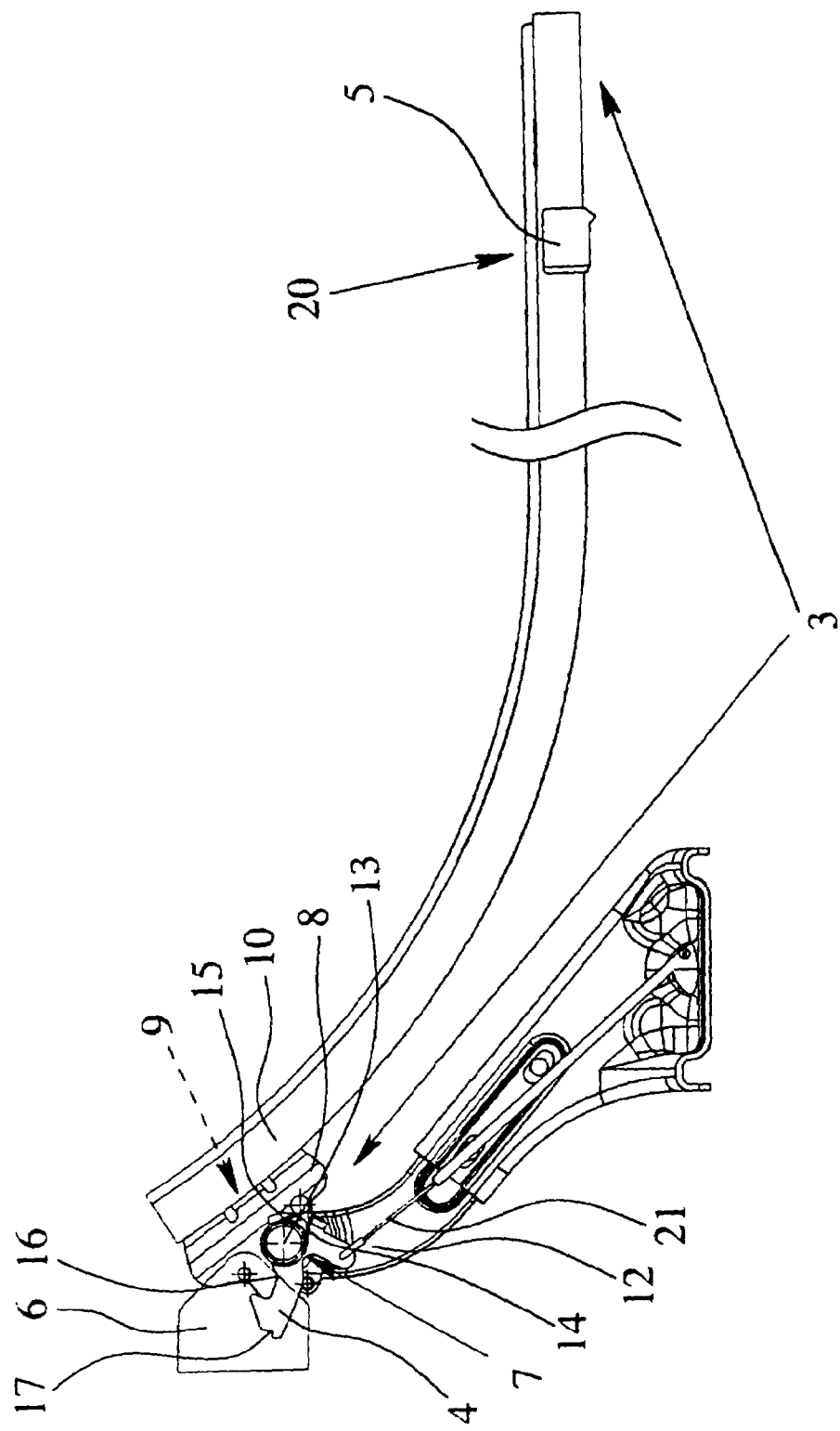
FIG. 3 shows the representation according to FIG. 2 when the sliding door is in the closed position and when the catch lever is in the raised state.

The lock arrangement 2 is equipped here with a catch lever arrangement 3 which has a pivoting catch lever 4. The catch lever 4 can be moved into the engaged state (FIG. 2, FIG. 4) and into the raised state (FIG. 3). The catch lever arrangement 3 has a first engagement element 5 and a second engagement element 6 which the catch lever 4 which is in the engaged state can be caused to engage. "State" here does not mean, for example, a distinct position of the catch lever. Rather, it is the respective operating state. In the engaged state, the catch lever 4 is engaged with one of the two engagement elements 5, 6. In the raised state, the catch lever 4 is disengaged, therefore free of the engagement elements 5, 6.

The catch lever 4, when the sliding door 1 is in the opened position (FIG. 4), can be caused to engage the first engagement element 5, the catch lever 4 which is then in the engaged state fixing the sliding door 1 in the opened position. Depending on the configuration, it can be provided that the catch lever 4 automatically snaps into the engaged state when the sliding door 1 is moved into the opened position. However, it can also be advantageous for the catch lever 4 to be transferred from the raised state into the engaged state when the sliding door 1 reaches the opened position in a controlled manner.

When the sliding door 1 is in the closed position, the catch lever 4 can be caused to engage the second engagement element 6, the catch lever 4 which is then in the engaged state fixing the sliding door 1 in the closed position. Here, snapping of the catch lever 4 into the engaged state but also controlled guidance of the catch lever 4 into the engaged state are conceivable.

What is important at this point is that the arrangement is such that the pretensioning of the catch lever 4 in the direction of the engaged state rises by the movement of the sliding door 1 into the closed position. The pretensioning of the catch lever 4 in FIG. 2 acts around to the right so that this pretensioning provides for reliable engagement between the catch lever 4 and the second engagement element 6. The unwanted raising of the catch lever 4, especially in case of a crash, is counteracted by the corresponding increase of the pretensioning.

The rise of the pretensioning of the catch lever 4 by moving the sliding door 1 into the closed position is especially advantageous in the illustrated, preferred embodiment when the catch lever 4 is held here exclusively by its pretensioning in the engaged state. Therefore, no additional ratchet or the like is present which blocks the catch lever 4 in the engaged state. This is not necessary either due to the increased pretensioning, so that the construction is altogether especially simple.

The pretensioning of the catch lever 4 is preferably produced by a spring element 7 which is tensioned when the sliding door 1 is moved into the closed position. Therefore, a spring storage device is provided which is loaded when the sliding door 1 is moved into the closed position. By tensioning the spring element 7, the pretensioning of the catch lever 4 rises with the movement of the sliding door 1 into the closed position.

In order to enable the aforementioned tensioning of the spring element 7, the spring element 7 can be coupled in some way to the positioning motion of the sliding door 1. A concurrently running wheel which is connected to a corresponding spring element would also be possible here. One version which can be implemented in an especially structurally simple manner can be attained in a sliding door 1 with a carriage 8 which is located on the sliding door 1. The carriage 8 is equipped with a roller arrangement 9, the sliding door 1 being guided via the roller arrangement 9 in a guide rail 10.

In the embodiment shown in FIG. 1, there are a bottom guide rail 10 and a middle guide rail 11. Here, other versions are also conceivable. The approach in accordance with the invention is explained below using the bottom guide rail 10. This should not be understood to be limiting, all statements applying equally to the application of the approach in accordance with the invention to the middle guide rail 11 or to a top guide rail which may be present.

Figure 4:
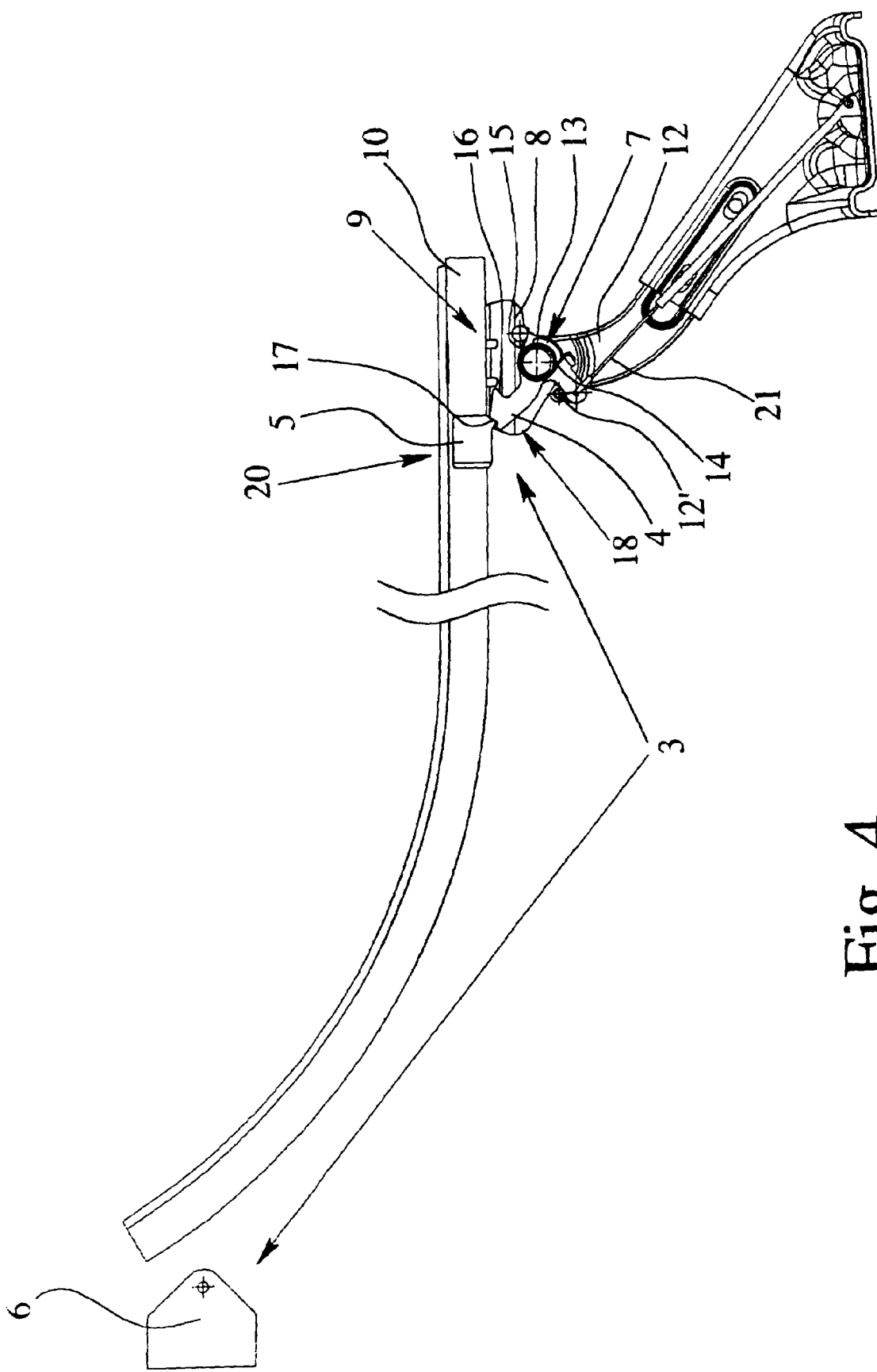
FIG. 4 shows the representation according to FIG. 2 when the sliding door is in the open position and when the catch lever is in the engaged state.
Figure 5:
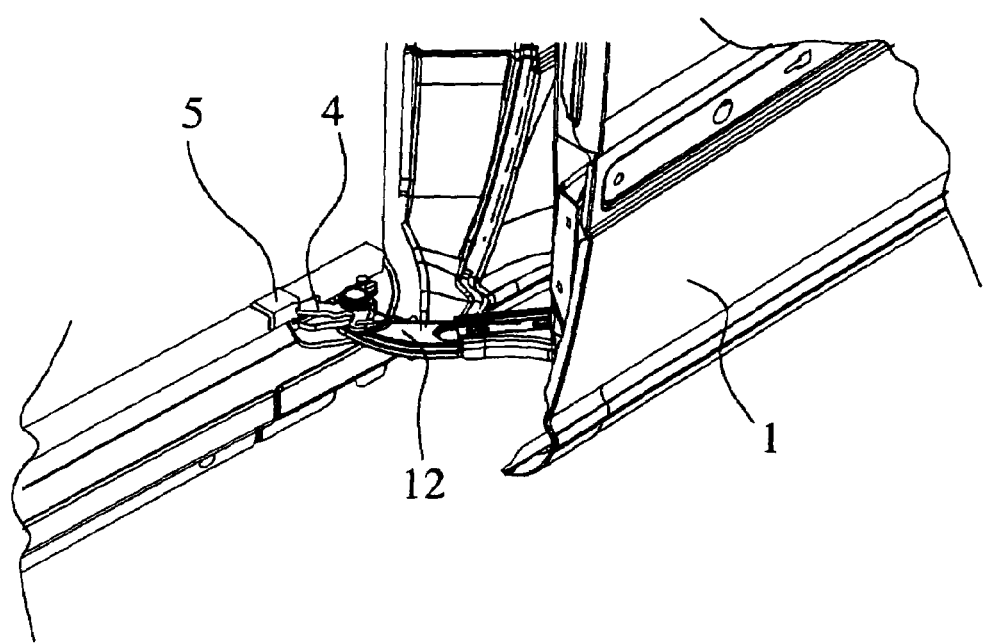
FIG. 5 is a perspective view a portion of the sliding door arrangement of FIG. 1 with the sliding door in the opened position.

The carriage 8 is located on a carrier component 12 to which the sliding door 1 is attached. This is shown in FIG. 5. The carriage 8 can be pivoted relative to the carrier component 12 around a vertical pivoting axis 13. This is necessary since the guide rail 10 runs in an arc into the vehicle viewed in FIGS. 2 to 4 from right to left. Combined examination of FIGS. 4 & 2 shows that the guide rail 10 is made such that the movement of the sliding door 1 into the closed position is associated with pivoting of the carriage 8 relative to the carrier component 12. This pivoting is used in the illustrated and preferred embodiment to tension the spring element 7 by moving the sliding door 1 into the closed position. For this purpose the catch lever 4 is located on the carrier component 12, the spring element 7 being coupled to the catch lever 4, on the one hand, and to the carriage 8, on the other hand, such that tensioning of the spring element 7 is associated with pivoting of the carriage 8 when the sliding door 1 is moved into the closed position.

In one especially simple and durable configuration, the spring element 7 is made as a leg spring, one end 14 of the leg spring 7 being fixed on the catch lever 4 and the other end 15 of the leg spring 7 being fixed on the carriage 8. In FIGS. 4 & 2, a stop 12' on the carrier component 12 is identified with which the catch lever 4 comes into contact with the actuating arm on one side under the action of the spring force of the spring element 7. When the sliding door 1 with the carrier component 12 attached to it in an angularly stiff manner is moved from the opened position in FIG. 4 into the closed position in FIG. 2, the three-dimensional location of the stop 12' is maintained, while the three-dimensional location of the carriage 8 changes. While the three-dimensional location of the end 14 of the leg spring 7 on the catch lever 4 remains unchanged, the other end 15 of the leg spring 7 on the carriage 8 in the transition from FIG. 4 to FIG. 2 is pressed down, and thus, nearer the first end 14 of the leg spring 7. The result is the increased pretensioning of the spring element—leg spring 7.

The implementation of the engagement of the catch lever 4 with the first engagement element 5, on the one hand, and with the second engagement element 6, on the other hand, is especially advantageous. This is also the subject matter of another independent teaching.

According to the aforementioned further teaching, it is important that the arrangement is made such that when the sliding door 1 is in one position, the catch lever 4 works as a hooked catch lever, and when the sliding door 1 is in the other position, it functions as a support catch lever. One position and the other here mean the closed position, on the one hand, and the open position, on the other. The advantages associated with this further teaching were explained above. It should be pointed out that this further teaching can be implemented independently of the increasing pretensioning of the catch lever 4.

For operation of the catch lever 4 as a hooked catch lever, it has a hook-shaped portion 16 for engaging the first engagement element 5 or the second engagement element 6, preferably for engaging the second engagement element 6. For operation as a support catch lever, the catch lever 4 is also provided with a support section 17 for engaging the respective engagement element, preferably the first engagement element 5. The support section 17 here is implemented as a simple shoulder which is located on the front end of the catch lever 4. FIGS. 2 to 4 show that the hook-shaped portion 16, on the one hand, and the support section 17, on the other hand, are located on an arm 18 of the catch lever 4. It is compact and simple to produce.

In the illustrated, preferred embodiment, one of the engagement elements 5, 6, here the second engagement element 6, is made as a striker for engaging the hook-shaped portion 16 of the catch lever 4. The other of the engagement elements 5, 6, here the first engagement element 5, is made as a catch cam for engaging the support section 17 of the catch lever 4. Various other alternatives are possible for the striker and the catch cam.

One especially simple configuration of the catch cam 5 is shown by FIGS. 2 to 4. Here, the catch cam 5 is located on the guide rail 10, the catch cam 5 preferably being made by sheet metal 20 provided with a corresponding shaped portion and seated on the guide rail 10. The sheet metal 20 is welded, riveted or in some other way connected to the guide rail 10. Fundamentally it can also be provided that the catch cam 5 is made as a shaped portion in the guide rail 10, itself.

The curved execution of the guide rail 10 has special importance for crash safety of the sliding door arrangement in accordance with the invention. In this way, it is specifically possible for the catch lever 4, which is in the engaged state, to be engaged to the second engagement element 6, which can be accommodated via the catch lever, to apply a force transversely to the lengthwise direction of the motor vehicle. The above described pulling of the sliding door 1 out of the guide rail 10 in case of a crash, especially in a side impact, is therefore prevented by the catch lever 4.

A series of possibilities are conceivable for actuating the catch lever 4, especially for raising the catch lever 4 out of the engaged state. In the illustrated, preferred embodiment, there is a flexible tension means 21 on the carrier component 12 for this purpose. The flexible tension means 21 can be made, for example, as a Bowden cable or as a cable pull. Raising of the catch lever 4 can take place manually or by a motor.

With respect to motorized lifting of the catch lever 4, reference is made to commonly owned U.S. Patent Application Publication 2006/0059783 A. The entire disclosure contents of this patent application publication hereby incorporated by reference into this application.

FIG. 1 shows that the lock arrangement 2 in accordance with the invention has a main lock arrangement 22 by which the sliding door 1 can be fixed in the closed position, and has an auxiliary lock arrangement for supporting the main lock arrangement 22, the above described catch lever arrangement 3 being assigned to the auxiliary lock arrangement. The main lock arrangement 22 is therefore designed such that it takes up most of the forces acting on the sliding door 1 which is in the closed position. However, basically it can also be provided that the main lock arrangement 22 and the auxiliary lock arrangement, here the catch lever arrangement 3, accommodate the corresponding forces to equal parts.

In the illustrated preferred embodiment, the main lock arrangement 22 and the auxiliary lock arrangement, here the catch lever arrangement 3, are located viewed in the lengthwise direction of the vehicle on opposing regions of the sliding door 1. This leads to an increase of the crash safety, especially in a side impact.

For implementing the main lock arrangement 22 a series of possibilities are conceivable. One especially preferred configuration consists in equipping the main lock arrangement 22 with the conventional latching elements, the latch and ratchet.

Figure 6:
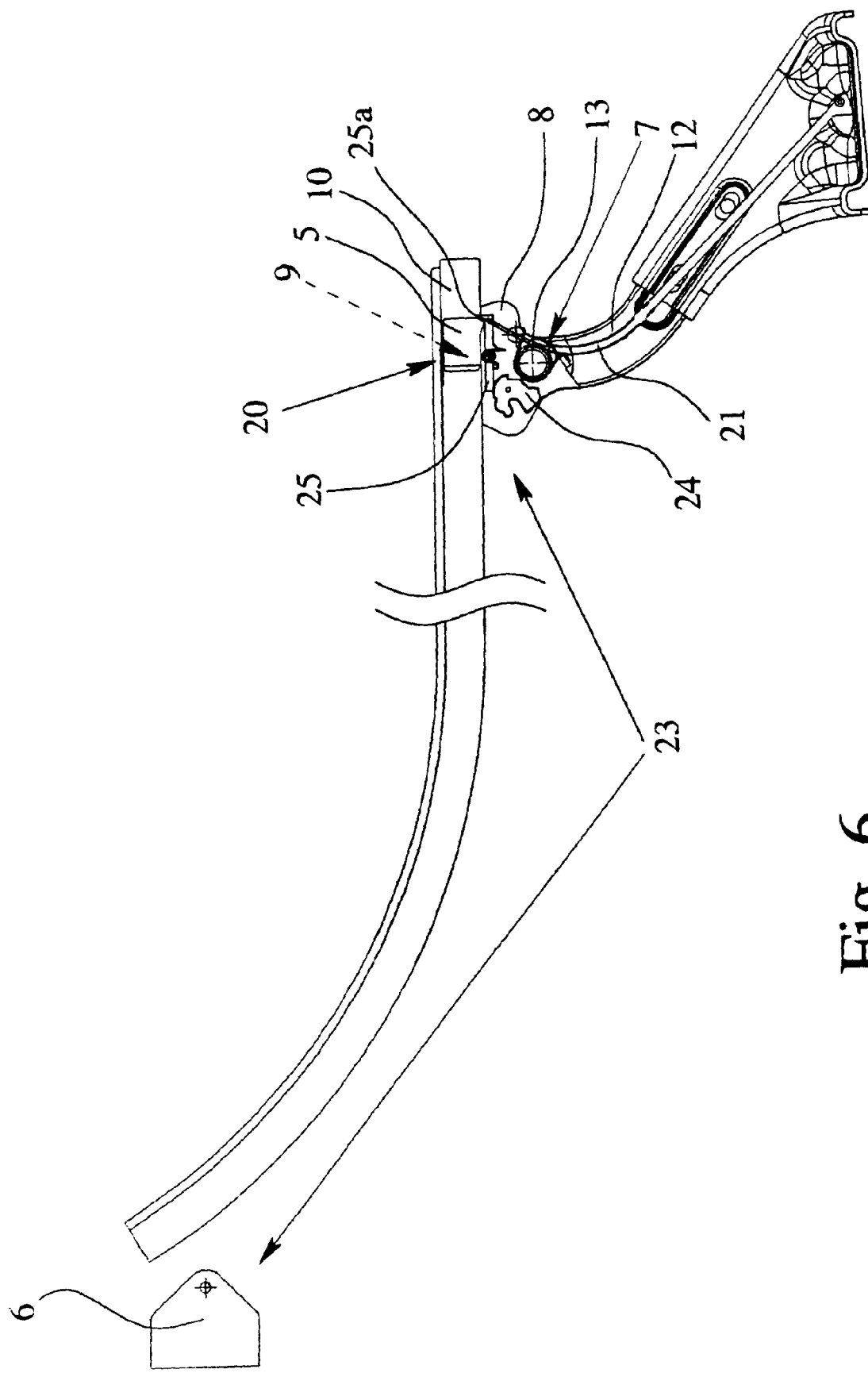
FIG. 6 shows important components of another sliding door arrangement in accordance with the invention in a representation corresponding to FIG. 4.

According to another teaching which likewise acquires independent importance, in turn the double use of a catch lever for fixing the sliding door arrangement in the opened position on the one hand and for fixing the sliding door arrangement in the closed position on the other is suggested. This configuration is shown in FIG. 6.

The lock arrangement here has a latch arrangement 23, the latch arrangement 23 here being equipped with a pivoting latch 24 and a ratchet 25. The latch 24 can be moved between an open position and a catch position and is held in the catch position by the ratchet 25. The latch arrangement 23 has a first engagement element 5 and a second engagement element 6, the latch 24 engaging the second engagement element 6 when the sliding door 1 is moved into the closed position, in this way is transferred into the catch position and the sliding door 1 is fixed in the closed position. The latch arrangement 23 corresponds in this respect to the arrangement which is conventional for current motor vehicle door locks.

According to this further teaching, it is important that the ratchet 25 of the latch arrangement 23 engages the first engagement element 5 when the sliding door 1 is moved into the opened position and in this way the sliding door 1 is fixed in the opened position. The ratchet 25 for this purpose in addition has a hook-shaped portion 25*a*. The ratchet 25 is therefore used not only for fixing the latch 24 in the catch position, but likewise also, as explained above, for fixing the sliding door 1 in the opened position. Depending on the construction boundary conditions, the ratchet 25 when the sliding door 1 is in the opened position can work as a hooked catch lever (FIG. 6) or as a support catch lever (not shown). The corresponding of course applies to the engagement of the ratchet 25 with the latch 24.

Fundamentally, the ratchet 25, as explained above, can be coupled here to the positioning motion of the sliding door 1. In this connection, as likewise described above, variable pretensioning of the ratchet 25 can lead to good results. Corresponding coupling however can also be suited to moving the ratchet 25 when the sliding door 1 is being moved into the open position such that it moves into the engagement region of the first engagement element 5 and otherwise lies outside this engagement region.

In this version of the double use of a catch lever, it is especially advantageous that the latch arrangement 23, formed of the latch 24 and the ratchet 25, is used to fix the sliding door 1 in the closed position, while to fix the sliding door 1 in the opened position only the ratchet 25 is used. It has also been recognized here that the function of fixing the sliding door 1 in the opened position is not equivalent to the function of fixing the sliding door 1 in the closed position. This was already explained above.

The described latch arrangement 23, optionally as an auxiliary lock arrangement, can also be used together with the above described main lock arrangement. All the aforementioned statements on the interplay of a main lock arrangement with an auxiliary lock arrangement apply equally to the latch arrangement according to the other independent teaching.

In all the described sliding door arrangements, it is preferably such that the engagement elements are located on the body of the motor vehicle, and that the elements which can be caused to engage the engagement elements, for example the catch lever, are located for example on the sliding door arrangement. But this can also be provided the other way around. Then, the engagement elements are located on the sliding door arrangement and engage the corresponding components on the body.

Finally, it should be pointed out that all the described lock arrangements are also commercial as such and are claimed accordingly. With respect to the configuration of the lock arrangement, reference should be made to the aforementioned statements.

What is claimed is:

1. Sliding door arrangement for a motor vehicle, comprising:
    a sliding door, the sliding door being slidably movable into the opened position and into a closed position, and
    a lock arrangement for fixing the door in the opened and the closed positions, the lock arrangement having a catch lever arrangement with a pivoting catch lever, the catch lever being movable into an engaged state and into a raised state and being pretensioned into the engaged state, the catch lever arrangement having a first engagement element and a second engagement element which are engageable by the catch lever in the engaged state, the catch lever being engageable with the first engagement element when the sliding door is in the opened position and the catch lever, in the engaged state, fixing the sliding door in the opened position,
    wherein the catch lever is engageable with the second engagement element when the sliding door is in the closed position and wherein the catch lever, in the engaged state, fixing the sliding door in the closed position, and
    wherein the arrangement is such that the pretensioning of the catch lever in a direction toward the engaged state rises by movement of the sliding door into the closed position.

2. Sliding door arrangement in accordance with claim 1, wherein the catch lever is held in the engaged state solely by its pretensioning.

3. Sliding door arrangement in accordance with claim 1, wherein there is a spring element which produces said pretensioning of the catch lever, and which is pretensioned when the sliding door is moved into the closed position, by which the pretensioning of the catch lever into the engaged state rises with the movement of the sliding door into the closed position.

4. Sliding door arrangement in accordance with claim 3, further comprising a carriage which is located on the sliding door with a roller arrangement and wherein the sliding door is guided via the roller arrangement in a guide rail on a body of the motor vehicle, wherein the roller is located on a carrier component and is pivoted relative to the carrier component around a vertical pivoting axis and wherein the guide rail is shaped for causing the movement of the sliding door into the closed position to cause pivoting of the carriage relative to the carrier component.

5. Sliding door arrangement in accordance with claim 4, wherein the catch lever is located on the carrier component and wherein the spring element is coupled to the catch lever and to the carriage such that tensioning of the spring element is associated with pivoting of the carriage when the sliding door is moved into the closed position.

6. Sliding door arrangement in accordance with claim 5, wherein the spring element is a leg spring and wherein one end of the leg spring is fixed on the catch lever and another end of the leg spring is fixed on the carriage.

7. Sliding door arrangement in accordance with claim 1, further comprising a flexible tension means for raising of the catch lever out of the engaged state.

8. Sliding door arrangement for a motor vehicle, comprising:
    a sliding door, the sliding door being slidably movable into the opened position and into a closed position, and
    a lock arrangement for fixing the door in the opened and the closed positions, the lock arrangement having a catch lever arrangement, the catch lever arrangement having a pivoting catch lever, the catch lever being movable into an engaged state and into a raised state and being pretensioned into the engaged state, the catch lever arrangement having a first engagement element and a second engagement element with which the catch lever is engageable, the catch lever when the sliding door is in the opened position being engageable with the first engagement element and the catch lever which is in the engaged state fixing the sliding door in the opened position,
    wherein the catch lever is caused to engage the second engagement element when the sliding door is in the closed position and wherein the catch lever, in the engaged state, fixes the sliding door in the closed position, and wherein the catch lever works as one of a hooked catch lever and as a support catch lever when the sliding door is in the closed position and conversely works as the other of a support catch lever or a hooked catch lever when the sliding door is in the opened position.

9. Sliding door arrangement in accordance with claim 8, wherein the catch lever has a hook-shaped portion for engaging one of the first engagement element and the second engagement element and wherein the catch lever has a support section for engaging the other of the first and second engagement elements.

10. Sliding door arrangement in accordance with claim 9, wherein the hook-shaped portion and the support section are located on an arm of the catch lever.

11. Sliding door arrangement in accordance with claim 9, wherein one of the engagement elements is a striker for engaging the hook-shaped portion of the catch lever and the other of the engagement elements is a catch cam for engaging the support section of the catch lever.

12. Sliding door arrangement for a motor vehicle, comprising:
    a sliding door, the sliding door being slidably movable into the opened position and into a closed position, and
    a lock arrangement for fixing the door in the opened and the closed positions, the lock arrangement having a latch arrangement with a pivoting latch and a ratchet, the latch being movable between an open position and a catch position and being held in the catch position by the ratchet, the latch arrangement having a first engagement element and a second engagement element and the latch, when the sliding door is moved into the closed position, engaging the second engagement element so as to be transferred into the catch position for fixing the sliding door in the closed position,
    wherein the ratchet of the latch arrangement engages the first engagement element when the sliding door is moved into the opened position so as to fix the sliding door in the opened position.

13. Sliding door arrangement in accordance with claim 12, wherein the ratchet works as a hooked catch lever when the sliding door is in the opened position.

14. Lock arrangement of a sliding door arrangement for a motor vehicle for fixing a sliding door in opened and closed positions, the lock arrangement having a catch lever arrangement with a pivoting catch lever, the catch lever being movable into an engaged state and into a raised state and being pretensioned in the engaged state, the catch lever arrangement having a first engagement element and a second engagement element with which the catch lever is engageable, the catch lever, when the sliding door is moved into the opened position, engaging the first engagement element and fixing the sliding door in the opened position, wherein the catch lever is engageable with the second engagement element when the sliding door is in the closed position, wherein the catch lever fixes the sliding door in the closed position and wherein the pretensioning of the catch lever is in a direction toward the engaged state and movement of the sliding door into the closed position is adapted to cause it to rise.

15. Lock arrangement of a sliding door arrangement for a motor vehicle, for fixing a sliding door in opened and closed positions, the lock arrangement having a catch lever arrangement with a pivoting catch lever, the catch lever, the catch lever being movable into an engaged state and into a raised state and being pretensioned in the engaged state, the catch lever arrangement having a first engagement element and a second engagement element, the catch lever being engageable with the second engagement element in said engaged stated and engaging the first engagement element when the sliding door is moved into the opened position for fixing the sliding door in the opened position, wherein the catch lever is engageable with the second engagement element when the sliding door is in the closed position, wherein the catch lever, in the engaged state, fixes the sliding door in the closed position, and wherein the arrangement is such that the catch lever works as one of a hooked catch lever and a support catch lever when the sliding door is in the closed position and works as the other of a support catch lever and a hooked catch lever when the sliding door is in the opened position.

16. Lock arrangement of a sliding door arrangement for a motor vehicle, for fixing a sliding door in opened and closed positions, the lock arrangement having a latch arrangement, the latch arrangement having a pivoting latch and a ratchet, the latch being movable between an open position and a catch position and being held in the catch position by the ratchet, the latch arrangement having a first engagement element and a second engagement element and the latch engaging the second engagement element when the sliding door is moved into the closed position, thereby transferring the latch into the catch position and fixing the sliding door in the closed position, wherein the ratchet of the latch arrangement engages the first engagement element when the sliding door is moved into the opened position, thereby fixing the sliding door in the open position.

* * * * *